REVERSIBLE DRIVING DEVICE FOR MAGNETIC TAPE RECORDERS

Filed Aug. 15, 1966 2 Sheets-Sheet 1

Dec. 9, 1969 O. CYTRIN 3,482,840

REVERSIBLE DRIVING DEVICE FOR MAGNETIC TAPE RECORDERS

Filed Aug. 15, 1966 2 Sheets-Sheet 2

United States Patent Office 3,482,840
Patented Dec. 9, 1969

3,482,840

REVERSIBLE DRIVING DEVICE FOR MAGNETIC TAPE RECORDERS

Oscar Cytrin, Antony, France, assignor to Compagnie des Compteurs, Paris, France, a French company Filed Aug. 15, 1966, Ser. No. 572,442
Claims priority, application France, Aug. 26, 1965, 29,551
Int. Cl. G11b *25/06*
U.S. Cl. 274—4 5 Claims

ABSTRACT OF THE DISCLOSURE

A reversible drive device for a magnetic tape recorder comprises a pair of spaced pulleys, an endless belt which extends around an is held tautly between the two pulleys, a pair of spaced capstans selectively rotating in opposite directions establish frictional contact with only the belt and drive the belt in opposite directions and a brake for the belt, the brake being applied when neither of the driving capstans is being driven. A magnetic tape extends over the pulleys in contact with one side of the belt throughout the distance between the pulleys, and springs are provided to apply tension to the tape at the tape leaving side of each of the pulleys to cause the section of the tape between the pulleys to be pressed into contact with the belt. The usual magnetic recorder and reading head is associated with that part of the tape which extends between the two pulleys.

The present invention relates to a device for driving magnetic tape recorders, more particularly for rapid starting and stopping magnetic tape of tape recorders intended to record numerical data.

It is known that this kind of appliances is used in connection with numerical computers, and that hence, working conditions necessitate very frequent starts and stops of the tape in extremely short times, also the rapid reversion of the running direction of the tape.

Whatever may be the driving device of known type adopted: capstan and presser-roller, single servo capstan, pneumatic capstan, the part of the tape which is in front of the recording and reading head unit is subjected to a mechanical stress, especially during transitory rates, i.e., during periods for starting up and stopping. This inevitably means undesirable speed variations that are harmful to the quality of recording or reading.

The invention has for its object to obviate this disadvantage by creating arrangements according to which the drive of the tape takes place equally well downstream or upstream from the head unit, in particular, on a substantial length of tape on either side of this unit.

The driving arrangement according to the invention, comprises an endless belt on which driving or braking means act, and the tape is applied on one part of the belt under the effect of tensions exerted on the latter by adjacent members acting as reserve on its travel, so that the drive of the tape occurs exclusively by means of the belt.

Furthermore, the tape is applied on the belt by its surface which is not coated with the magnetic recording layer, and the head unit is placed on the travel of the tape at a point where the latter is in contact with the driving belt.

Owing to the interposition of this belt, the device affords several advantages as compared with usual driving means:

(a) Thanks to the contact existing between the tape and the belt over a rather considerable surface, the drive takes place both upstream and downstream from the head unit, and there are no stresses on the tape causing undesirable speed variations at transitory rates. One can thus obtain very brief starting times, in the region of a few milliseconds, with very rapid speed stabilization.

(b) The contact between the tape and belt is very close, the belt being rectified and revolving perfectly; there are thus very few parasite displacements of the tape in relation to the heads, and hence the dynamic dispersion of the pulses recorded in very slight.

(c) Lastly, acceleration forces when putting under speed being distributed over a wide surface of the tape, the risks of deteriorating said type is very much less than in the usual devices providing direct drive of the tape by capstan.

The invention will be better understood by referring to the following description and the attached drawing, given by way of non-restrictive example, in which.

Figure 1:
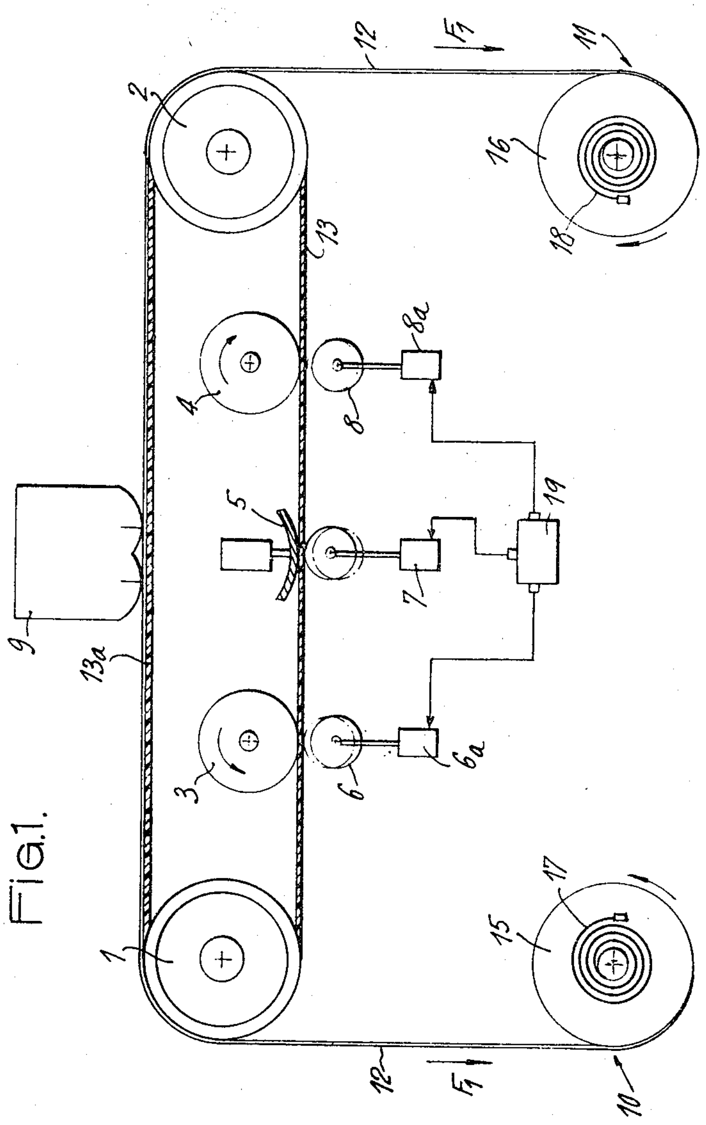
FIGURES 1 and 2 show two different embodiments of a driving device according to the invention.
Figure 2:
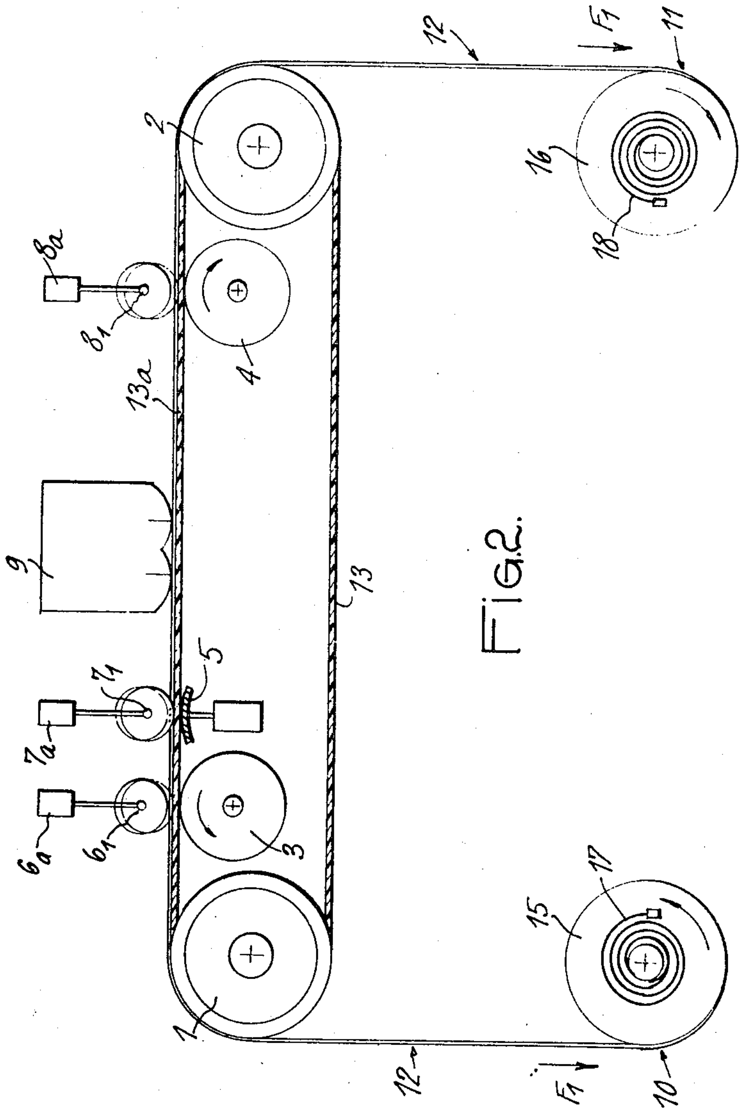

In FIG. 1, 1 and 2 designate two reversing pulleys on which an endless belt 13 is stretched, for example, of practically non-extensible rubbered fabric.

12 designates the magnetic tape to be driven which is applied against the upper side 13*a* of the belt 13 under the effect of forces $F_1$ which are exerted on the tape at 10 and 11, and which are developed on each side of the driving device, for example, in members acting as reserve for the tape under tension, such as a pneumatic, mechanical reserve, or any other equivalent means which are diagrammatized by the reels 15, 16 provided with spiral springs 17, 18 of other equivalent members. The tape 12 is applied to the belt by its support side, i.e., by its face opposite to the sensitized face which is covered with the magnetic film acting as a recording layer. The recording layer not being in contact with the belt, does not risk becoming damaged during the drive of the tape.

9 designates the magnetic recording and reading head unit, placed on the path of the tape at a point on the upper side 13*a* of the belt 13 where the tape 12 is in contact with the latter.

3 and 4 show two capstans, revolving selectively in opposite directions and able to drive the belt 13 in one direction or the other, according to pressure-roller 6 or 8, which, under the action of a corresponding electro-magnet respectively 6*a* and 8*a*, presses against the belt 13 at the impulse of an external control unit 19 (measuring unit, memory, computer, etc.). In this method of embodiment, the capstans act on the lower side of the belt 13, opposite to that on which the magnet tape 12 is applied.

When the belt 13 is driven by one of the capstans 3 or 4, it drives, in its turn, by its upper side, the magnetic tape 12 which closely adheres to its surface by the action of forces $F_1$. We thus see that the drive of the tape takes place on a considerable surface both upstream and downstream from the head unit 9, hence, the previously announced advantages result therefrom, by this driving method.

A brake shoe 5, placed between the capstans 3 and 4 and associated with an electro-magnet 7 is provided for acting on the lower side of the belt 13. When a stoppage occurs by the impulse of the external control unit 19, it enables weak inertias to be cancelled out that are still in movement after suppressing the action of the capstan, which means a very rapid stopping of the tape and especially very slight dispersions on stopping distances and times.

Figure 3:
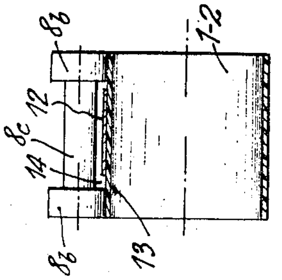
FIGURE 3 is a profile view of the device of FIG. 2.

In FIGURE 2, where the same elements are designated by the same reference numerals, is shown another embdiment derived from the preceding one. It differs from it in that the driving and braking means of the belt 13 are placed on the upper side 13*a* where the magnetic tape 12 passes and close to the head unit 9. However, to prevent the pressers $6_1$, $8_1$, $7_1$ associated with the elements 3, 4, 5 from coming into contact with the tape and causing wear and constraints to it, which would revert to the disadvantages of usual driving devices, two modifications are applied:

(a) The belt 13 is dimensioned so as to have an appreciably greater width than the tape 12, for example, at least double, (b) The pressers $6_1$, $7_1$, $8_1$ have a suitable profile, for example, as shown in FIG. 3, where their central part 8*c* is provided with a smaller diameter, so as to provide a recess 14 for the passage of the tape 12 and to drive the belt 13 only by their ends 8*b* without any direct contact with the tape. Thus, the tape 12 always remains driven or braked by means of the belt, as in the device of FIG. 1, and not directly by the presser-rollers. It follows that variant of the device possesses the same advantages as previously described.

The invention is not, however, restricted to the specific structure related for driving the belt by capstans and presser-rollers that have just been described. For example, the reversing pulley 1 can be replaced as known per se by a single capstan, with a high friction coefficient on the belt and subjected in speed according to the impulse of the external control unit 19. It is thus evident that in this case, the capstans 3 and 4, the brake shoe 5, and the pressers 6, 7, 8 are eliminated, because they have become useless.

Another solution also consists of replacing the reversing pulley 1 by a blown air pneumatic capstan permanently rotating in a counter-clockwise direction, and to replace the reversing pulley 2 by a second blown air pneumatic capstan permanently rotating in a clockwise direction. Air blowing is controlled by rapid electrovalves, the suppression of blowing on one of the capstans enabling the putting of the belt and tape under speed in the driving direction of the other capstan in service. In this case, the brake shoe 5 and its presser 7 remain necessary for ensuring suitable stoppages of the tape.

Of course, other modifications can also be applied, without going outside of the scope of the invention.

I claim:

1. In a reversible drive device for a magnetic tape recorder, the combination comprising a pair of spaced pulleys, an endless belt extending around said pulleys and held tautly therebetween, means for selectively driving said belt in one direction or the other, means braking said belt to a stop when said belt driving means is not operating, a magnetic tape, said tape being in contact with said belt on parts thereof which extend at least partly around said pulleys as well as the part of the belt extending between said pulleys but not in contact with said driving means for said belt, means applying a tensional stress to said tape at the tape bearing side of each of said pulleys thereby to draw said tape into firm contact with said belt to assure a positive friction drive of the tape by the belt, and a magnetic recording and reading head disposed in operative relation with said tape and located at a position where said tape contacts said belt.

2. A reversible drive device for a tape recorder as defined in claim 1 wherein said means for selectively driving said belt in one direction or the other comprises a pair of selectively driven capstans located in spaced relation along said endless belt at one side thereof, said capstans being driven in opposite directions, a presser roller cooperative with each of said capstans, said presser rollers being located at the opposite side of said endless belt and opposite the corresponding capstan, and means for selectively actuating said rollers into pressure contact with said belt thereby to cause said belt to be pressed between the roller and corresponding capstan to effect a frictional drive for said belt, said capstans and pressure rollers being engageable only with said belt so as to avoid contact with the magnetic tape.

3. A reversible drive device for a tape recorder as defined in claim 2 wherein said belt drive capstans and the presser rollers correlated thereto are located at that portion of the belt between said pulleys which is not in driving contact with the magnetic tape.

4. A reversible drive device for a tape recorder as defined in claim 2 wherein said belt is wider than the magnetic tape which is centered thereon and said capstans and pressure rollers contact those side portions of the belt along side of but not in contact with the magnetic tape.

5. A reversible drive device for a tape recorder as defined in claim 1 wherein said braking means for said belt comprises a brake shoe at one side of said belt, a presser roller cooperative therewith at the opposite side of said belt, said brake shoe and presser roller contacting only the belt and not the magnetic tape thereon, and means for actuating said presser roller in the direction of said brake shoe when said belt driving means is not operating thereby to cause the belt to be pinched between the roller and belt and thereby functioning as a frictional brake to stop the belt.

References Cited

UNITED STATES PATENTS

| | | | |
|---|---|---|---|
| 3,207,399 | 9/1965 | Dekker | 226—51 |
| 3,140,360 | 7/1964 | Whitworth | 179—100.2 |
| 3,057,529 | 10/1962 | Fitch | 226—170 |
| 2,862,715 | 12/1958 | MacDonald | 274—4 |
| 2,831,678 | 4/1958 | MacNeill | 226—50 |

LEONARD FORMAN, Primary Examiner

R. A. FIELDS, Assistant Examiner

U.S. Cl. X.R.

179—100.2; 226—49